May 16, 1950     C. C. WHITTAKER     2,508,205
TEMPERATURE INDICATING DEVICE
Filed March 8, 1947
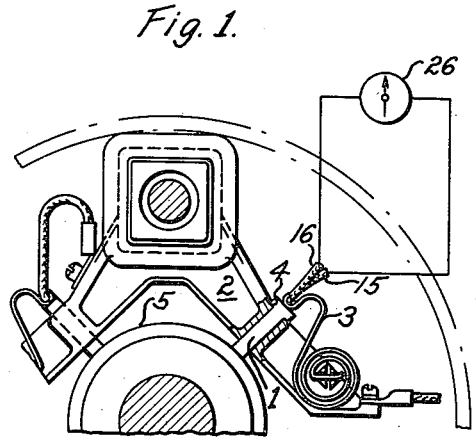
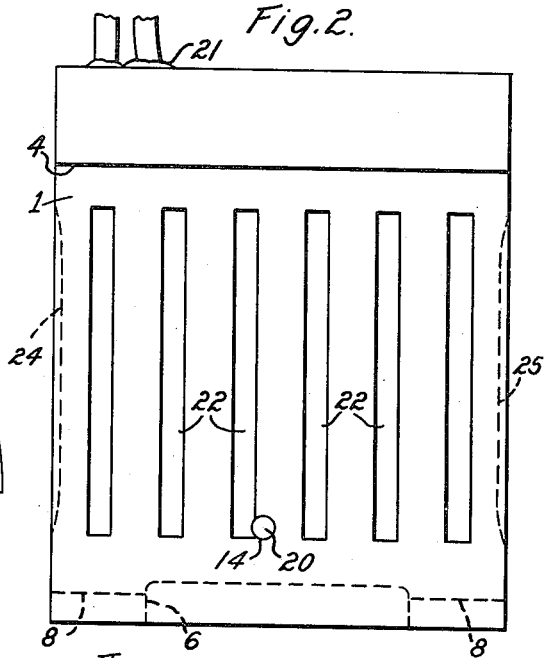
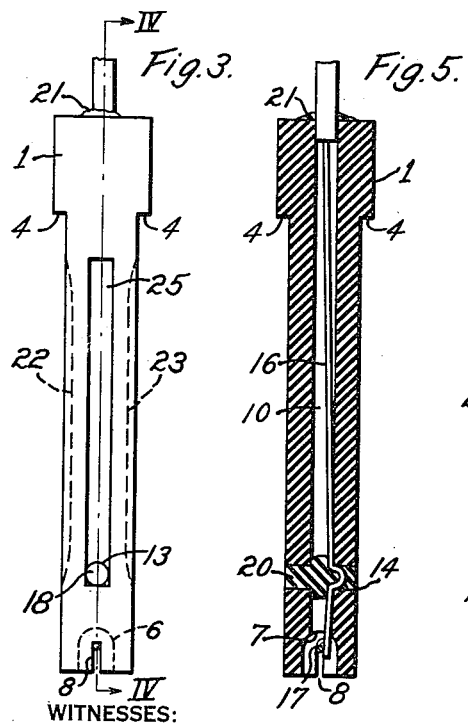
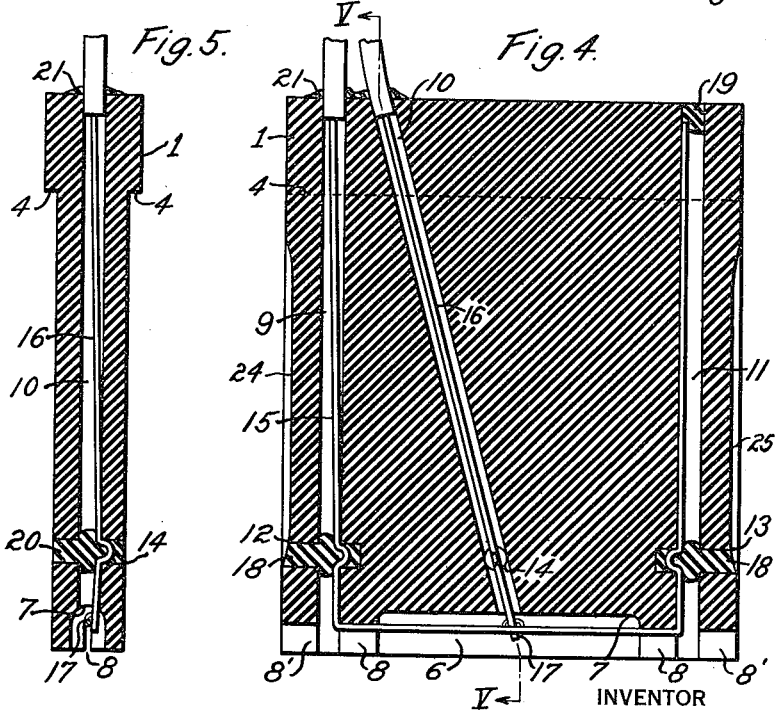
WITNESSES:
Wm. B. Sellers
Nw. C. Groove
INVENTOR
Charles C. Whittaker.
BY
Paul E. Friedemann
ATTORNEY Patented May 16, 1950

2,508,205

UNITED STATES PATENT OFFICE 2,508,205

TEMPERATURE INDICATING DEVICE

Charles C. Whittaker, Pittsburgh, Pa., assignor to Westinghouse Electric Corporation, East Pittsburgh, Pa., a corporation of Pennsylvania Application March 8, 1947, Serial No. 733,380

6 Claims. (Cl. 136—4)

My invention relates to temperature measuring devices, and more particularly to thermocouples for indicating the temperature of the commutators of dynamoelectric machines.

There are many devices on the market which will either indicate or record, or both, temperatures as determined by thermocouples. To indicate, or record, the temperature of a rotating commutator of a dynamoelectric machine thus becomes a problem of producing a thermocouple and thermocouple structure that will produce temperature indications that follow reasonably accurately the actual temperatures of the rotating commutator of a dynamoelectric machine.

One broad object of my invention is the provision of a thermocouple and mounting structure for the thermocouple such that the electric current produced by the thermocouple is a substantially true function of the temperature of the machine element being scanned by the thermocouple.

Another broad object of my invention is the provision of a thermocouple and mounting structure therefor that the temperature indication produced by the thermocouple results primarily from the heat radiated from an object onto the thermocouple.

It is also an object of my invention to incorporate a thermocouple into a brush structure designed to be mounted in the conventional commutator brush holders and having a contour to collect the radiation of the heat of the commutator bars of a dynamoelectric machine in the region of the junction of the thermocouple.

Other objects and advantages will become more apparent from a study of the following specification and the accompanying drawing, in which:

Figure 1 is an end view of a dynamoelectric machine having the commutator and brush holders and brushes associated with the commutator;

Fig. 2 is a side view of the subject matter of my invention;

Fig. 3 is an edge view of the showing in Fig. 2;

Fig. 4 is a view in section of my invention, the section being taken on line IV—IV of Fig. 3, with the central fillet being omitted for clarity; and Fig. 5 is a sectional view on section line V—V of Fig. 4.

In prior art practice to measure the temperature of a movable body the thermocouple had to be either attached to the body or brought in sliding contact with the body, the temperature of which was to be measured. When the thermocouple is attached to the body, slip rings and other structures are necessary to get the potential produced by the thermocouple to the indicating meter. This complicated structure had the further disadvantage that it was extremely difficult to make a thermocouple stick to a movable body as a rapidly rotating commutator.

If the thermocouple was brought into sliding contact, no accurate temperature indication could be obtained since the contact friction added an unknown heating component. Mere disposition of the thermocouple in proximity of a movable body will not do since too many extraneous temperature components destroy a correct measure of the temperature of the movable body.

I avoid all these difficulties by making use of a thermocouple disposed in air in proximity of the movable body, as a commutator, but I make provision for good thermal contact between the hot body and the thermocouple. In the construction I utilize, there is no physical contact between the hot body and the thermocouple, but there is good thermal contact.

For my purpose I utilize a piece of melamine asbestos 1 and shape it to fit into a conventional brush holder for the carbon collector or commutating brushes. The melamine asbestos brush may, and usually will have a width equal to several carbon brushes, and in use several carbon brushes will be removed to make room for the melamine brush. This is illustrated in Fig. 1 where the melamine element or brush 1 is fitted into the brush holder 2. The springs 3 hold the melamine brush 1 in the slot of the holder so that the shoulders 4 formed on the brush rest firmly against the top of the holder.

In the design of the melamine brush, the length between the bottom surfaces of the shoulders 4 and the bottom end of the brush is so chosen that the shoulders 4 at first do not rest against the holder 2 when the bottom contacts the commutator 5. In short, the brush 1 is at first just a trifle too long. As soon as the commutator wears the bottom end of the brush 1, the shoulders 4 come to rest against the holder 2 and the brush makes substantially no contact with the commutator, except possibly at some high spots. The clearance between the bottom end of the brush 1 and the commutator is thus extremely small.

The bottom of the brush 1 is provided with a longitudinally disposed groove 6 having a semi-cylindrical ceiling, or roof, 7. The inner surface of this groove is painted a dull black so that the radiated heat from the commutator 5 is readily absorbed and radiated back to the axial region of the groove.

The groove 6 extends only over a symmetrical mid-region and is either closed off completely at the outer bottom corners of the brush or brought into communication with the outside with a narrow slot 8 cut at each lower outer corner of the brush.

The melamine asbestos brush is provided with the drilled elongated openings 9, 10 and 11, the wells 12 and 13, and the transverse opening 14.

In the manufacture of my device the insulation is stripped off a suitable length of insulated electric wire 15 and the stripped off end is threaded down through opening 9, carried over to opening 11 and then threaded up through the opening 11. This electric wire is a copper nickel alloy sold under the trade name of Advance Wire.

The insulation is then stripped off for a suitable length from an insulated copper wire 16 and the stripped off end is then threaded down through opening 10. The lower end of wire 16 is then brazed or soldered or otherwise secured to the Advance wire at 17. The attachment is so made that the junction at 17 forms an excellent thermocouple.

The upper ends of the Advance wire 15 are then pulled up with considerable force to locate the junction 17 at the point shown and to dispose the portion of the wire 15 in the groove 6 at the axis of the groove 6. While the copper nickel alloy wire is thus held under tension the wire is given a kink as shown by means of a blunt instrument and a rapidly setting plastic plug 18 is forced into well 13 to firmly hold the wire in position. A similar operation and plug is used at well 12 to bend and grip the wire 15 at well 12. The upper right-hand end of wire 15 may now be trimmed off slightly below the top of the brush and a sealing plug 19 inserted.

Since the wire 15 is now tight, wire 16 is given some tension, a kink is put into the wire and the plug of rapidly setting plastic 20 forced into the opening 14 to firmly fix the copper wire in the brush. The upper insulated regions are now fixed to the brush 1 by the plastic material 21.

The brush 1 is provided with a plurality of parallel grooves 22 and 23 on each of the flat surfaces to limit the transfer of heat from the brush 1 to the holder 2. The edges may also be provided with grooves as grooves 24 and 25 to limit the transfer of heat from the adjacent carbon brushes to the melamine asbestos brush 1.

In use the melamine asbestos brush housing the thermocouple as described is disposed in the holder 2 and the outer ends of conductors 15 and 16 are connected to a suitable meter 26 indicating commutator temperature.

With the construction utilized, the commutator can radiate its heat directly onto the thermocouple and also to the black semicircular ceiling above the wire. This source of heat does not have to heat the whole brush as the remainder of the brush is on its edges in contact with the adjacent hot carbon brushes, and on the flat surfaces is in contact with the relatively cooler holder 2. The net result of the various heat transfers is to produce a temperature at the thermocouple practically equal to that of the commutator surface, at the continuous rating of the motor.

During tests with a motor having a continuous rating of 1560 amperes, the following results were obtained:

| Amps. on Motor | Average Difference |
|---|---|
| Amps. | °C. |
| 500 | 8 |
| 1,000 | 6 |
| 1,500 | 1.7 |

On tests it was also observed that the brush holder was cooler than the melamine brush while the adjacent carbon brushes were hotter. The grooves 22, 24 and 25 are thus very desirable to change the rate of heat transfer from the adjacent carbon brushes to the melamine asbestos brush, or from the melamine brush to the brush holder. The grooves, as shown, do not extend the full length of the brush. Air, therefore, does not blow through these grooves to affect the temperature indication.

Since the melamine brush, after it is worn into place, produces substantially no heat of friction in coacting with the commutator, and since the narrow slot 8 preferably extends only into the region of the openings 9 and 11 so that the corners 8′ close off the groove 6 at the ends, it is apparent that substantially no convection currents of air are set up in the groove 6. The heat is thus transferred from the commutator to the thermocouple by radiation so that the temperature indication, namely the potential produced by the thermocouple, is an accurate reflection of the commutator temperature.

While I have shown and described but one embodiment, I do not wish to be limited to the exact showing made but wish to be limited only by the scope of the claims hereto appended.

I claim as my invention:

1. In a device for measuring the temperature of the commutator of a dynamoelectric machine, in combination, a melamine asbestos brush having generally the shape of the commutator brushes of the machine whose commutator temperature is to be measured, so as to fit in the regular brush holder of the machine, a shoulder on the melamine brush for limiting the movement of the melamine brush in the direction of the commutator, an elongated groove in the face of the melamine brush disposed in proximity to the commutator, said groove being shorter than the width of the brush and located in the mid-region so that the corners close off the ends of the groove, the wide sides terminating near the commutator, and the commutator closing the open portion of the groove whereby a substantially closed chamber is formed, a wire of an alloy containing nickel and copper disposed under tension in the region of the longitudinal axis of the groove, a copper wire attached to the wire of the alloy at the mid-portion thereof disposed in the groove to thus form a junction of a thermocouple, both said wires being secured in the brush and leads brought out at the top.

2. In a device for measuring the temperature of the commutator of a dynamoelectric machine, in combination, a melamine asbestos brush having generally the shape of the commutator brushes of the machine whose commutator temperature is to be measured, so as to fit in the regular brush holder of the machine, a shoulder on the melamine brush for limiting the movement of the melamine brush in the direction of the commutator, an elongated groove in the face of the melamine brush disposed in proximity to the commutator, said groove being shorter than the width of the brush and located in the mid-region so that the corners close off the ends of the groove, the wide sides terminating near the commutator, and the commutator closing the open portion of the groove whereby a substantially closed chamber is formed, the bottom of the groove is made arcuate so that the heat radiated from the commutator is radiated back by the melamine brush to the region of longitudinal axis of the groove, a wire of an alloy containing nickel and copper disposed under tension in the region of the longitudinal axis of the groove, a copper wire attached to the wire of the alloy at the mid-portion thereof disposed in the groove to thus form a junction of a thermocouple, both said wires being secured in the brush and leads brought out at the top.

3. In a device for measuring the temperature of the commutator of a dynamoelectric machine, in combination, a melamine asbestos brush having generally the shape of the commutator brushes of the machine whose commutator temperature is to be measured, so as to fit in the regular brush holder of the machine, a shoulder on the melamine brush for limiting the movement of the melamine brush in the direction of the commutator, an elongated groove in the face of the melamine brush disposed in proximity to the commutator, said groove being shorter than the width of the brush and located in the mid-region so that the corners close off the ends of the groove, the wide sides terminating near the commutator, and the commutator closing the open portion of the groove whereby a substantially closed chamber is formed, a dull black paint on the surface of the brush comprising the walls of the groove formed by the brush, a wire of an alloy containing nickel and copper disposed under tension in the region of the longitudinal axis of the groove a copper wire attached to the wire of the alloy at the mid-portion thereof disposed in the groove to thus form a junction of a thermocouple, both said wires being secured in the brush and leads brought out at the top.

4. In a device for measuring the temperature of the commutator of a dynamoelectric machine, in combination, a melamine asbestos brush having generally the shape of the commutator brushes of the machine whose commutator temperature is to be measured, so as to fit in the regular brush holder of the machine, a shoulder on the melamine brush for limiting the movement of the melamine brush in the direction of the commutator, an elongated groove in the face of the melamine brush disposed in proximity to the commutator, said groove being shorter than the width of the brush, and located in the mid-region so that the corners close off the ends of the groove, the wide sides terminating near the commutator, and the commutator closing the open portion of the groove whereby a substantially closed chamber is formed, the bottom of the groove is made arcuate so that the heat radiated from the commutator to the melamine brush is radiated back to the region of longitudinal axis of the groove, a dull black paint on the surface of the brush comprising the walls of the groove formed by the brush, a wire of an alloy containing nickel and copper disposed under tension in the region of the longitudinal axis of the groove, a copper wire attached to the wire of the alloy at the mid-portion thereof disposed in the groove to thus form a junction of a thermocouple, both said wires being secured in the brush and leads brought out at the top.

5. In a device for measuring the temperature of a rotating cylinder, in combination, a base, a brush holder mounted on the base, said holder having an elongated rectangular opening therein disposed radially of the cylinder, a melamine asbestos brush generally in the shape of a rectangular block disposed in the opening, said brush having a shoulder for limiting the movement of the brush in the direction of the cylinder, an elongated groove in the face of the brush disposed in proximity to the cylinder, said groove being shorter than the width of the brush and located in the mid-region so that the corners close off the ends of the groove, the wide sides terminating near the cylinder, and the cylinder closing the open portion of the groove whereby a substantially closed chamber is formed, a wire of an alloy containing nickel and copper disposed in the region of the longitudinal axis of the groove, a copper wire attached to the alloy wire at the region of the mid-portion of the groove to thus form a junction of a thermocouple, both of said wires being secured to the brush and leads brought out of the brush.

6. In a device for measuring the temperature of a rotating cylinder, in combination, a base, a brush holder mounted on the base, said holder having an elongated rectangular opening therein disposed radially of the cylinder, a melamine asbestos brush generally in the shape of a rectangular block disposed in the opening, said brush having a shoulder for limiting the movement of the brush in the direction of the cylinder, an elongated groove in the face of the brush disposed in proximity to the cylinder, said groove being shorter than the width of the brush and located in the mid-region so that the corners close off the ends of the groove, the wide sides terminating near the cylinder, and the cylinder closing the open portion of the groove whereby a substantially closed chamber is formed, a wire disposed in the region of the longitudinal axis of the groove, a second wire of dissimilar metal to provide an effective thermocouple junction attached to the first wire at the region of the mid-portion of the groove, both of said wires being secured to the brush and connecting leads brought out of the brush.

CHARLES C. WHITTAKER.

REFERENCES CITED

The following references are of record in the file of this patent:

UNITED STATES PATENTS

| Number | Name | Date |
| --- | --- | --- |
| 1,140,701 | Mitchell | May 25, 1915 |
| 1,680,589 | Bock | Aug. 14, 1928 |
| 1,758,532 | Phinney | May 13, 1930 |
| 1,907,540 | Hebler | May 9, 1933 |
| 1,944,449 | Munroe | Jan. 23, 1934 |
| 1,957,051 | Norton | May 1, 1934 |
| 2,095,877 | Junkins | Oct. 12, 1937 |
| 2,207,647 | Whipple | July 9, 1940 |